United States Patent
Saito

(10) Patent No.: US 8,708,269 B2
(45) Date of Patent: Apr. 29, 2014

(54) WEBBING TAKE-UP DEVICE

(75) Inventor: Takuhiro Saito, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 133 days.

(21) Appl. No.: 13/280,727

(22) Filed: Oct. 25, 2011

(65) Prior Publication Data

US 2012/0119009 A1 May 17, 2012

(30) Foreign Application Priority Data

Nov. 12, 2010 (JP) .................................. 2010-254069

(51) Int. Cl.
*B65H 75/48* (2006.01)

(52) U.S. Cl.
USPC ........................................ 242/374; 242/390.8

(58) Field of Classification Search
USPC ................. 242/374, 379, 382, 390.8
See application file for complete search history.

(56) References Cited

U.S. PATENT DOCUMENTS

| | | | | |
|---|---|---|---|---|
| 7,290,730 B2 * | 11/2007 | Nagata et al. | ................. | 242/374 |
| 7,484,683 B2 * | 2/2009 | Mori et al. | ..................... | 242/374 |
| 7,621,478 B2 * | 11/2009 | Sumiyashiki | ................ | 242/383 |

FOREIGN PATENT DOCUMENTS

| | | |
|---|---|---|
| JP | 2006-256515 | 9/2006 |
| JP | 2009051286 A | 3/2009 |
| JP | 2009-255866 | 11/2009 |
| JP | 201064606 A | 3/2010 |

OTHER PUBLICATIONS

Japanese Office Action dated Feb. 12, 2014 and its English Translation.

* cited by examiner

*Primary Examiner* — Sang Kim
(74) *Attorney, Agent, or Firm* — Roberts Mlotkowski Safran & Cole P.C.

(57) ABSTRACT

There is provided a webbing take-up device including: a spool to which an end of webbing is anchored and that takes up the webbing by rotating in a take-up direction; a lock portion that restricts rotation of the spool in a pullout direction, in a coupled state capable of transmitting rotation force to the spool; a sensor portion that actuates in a rapid vehicle deceleration state in which a vehicle is being decelerated with a deceleration of a specific value or greater, a state in which the spool is rapidly rotated with an acceleration of a specific value or greater in the pullout direction, or a combination thereof; a drive portion that rotates the spool in the take-up direction by forward driving force output and that actuates the sensor portion; and a clutch portion that couples the spool and the lock portion by actuation of the sensor portion.

6 Claims, 6 Drawing Sheets

WEBBING TAKE-UP DEVICE

CROSS-REFERENCE TO RELATED APPLICATION

This application is claims priority under 35 USC 119 from Japanese Patent Application No. 2010-254069 filed on Nov. 12, 2010, the disclosure of which is incorporated by reference herein.

BACKGROUND

1. Technical Field

The present invention relates to a webbing take-up device for taking up and storing webbing, and in particular to a webbing take-up device that has a drive section such as a motor employing driving force to rotating the spool in a take-up direction and a lock mechanism for restricting rotation of the spool in a pullout direction during, for example, rapid vehicle deceleration.

2. Related Art

In a webbing take-up device described in Japanese Patent Application Laid-Open (JP-A) No. 2009-51286, rotation of a lock clutch body in a pullout direction is restricted by a take-up drum being rapidly rotated in a pullout direction when a vehicle is rapidly decelerated. In this state, when relative rotation occurs in the pullout direction of a locking base relative to the lock clutch body due to rotation of the locking base in the pullout direction together with the take-up drum, a pawl provided to the locking base moves, and meshes with lock teeth formed to a housing. Rotation of the locking base in the pullout direction is thereby restricted, meaning that rotation of the take-up drum in the pullout direction is also restricted.

In a webbing take-up device described in JP-A No. 2010-64606, a ratchet gear and a lock gear are coupled by rapid rotation of a take-up drum in a pullout direction when a vehicle rapidly decelerates. In this state, when a take-up drum unit rotates in the pullout direction a pawl supported by a housing unit meshes with a ratchet gear. Rotation of the ratchet gear in the pullout direction, and hence rotation of the take-up drum in the pullout direction, is accordingly restricted.

In such webbing take-up devices, the pawl does not restrict rotation of the take-up drum until the take-up drum has rotated further in the pullout direction from the point in time detecting a state of rapid vehicle deceleration and/or a state in which the take-up drum has been rotated rabidly in the pullout direction.

SUMMARY

In consideration of the above circumstances the present invention is directed towards a webbing take-up device that, from a state of rapid vehicle deceleration and/or a state in which a spool has been rapidly rotated in the pullout direction, does not then require further rotation of the spool in the pullout direction before rotation of the spool in the pullout direction is restricted.

The first aspect of the present invention provides a webbing take-up device including:

a spool to which a base end side of webbing is anchored and that takes up the webbing by rotating in a take-up direction;

a lock portion that restricts rotation of the spool in a pullout direction opposite to the take-up direction, in a coupled state capable of transmitting rotation force to the spool;

a sensor portion that actuates in a state of rapid vehicle deceleration in which a vehicle is being decelerated with a deceleration of a specific value or greater, a state in which the spool is rapidly rotated with an acceleration of a specific value or greater in the pullout direction, or a combination thereof;

a drive portion that rotates the spool in the take-up direction by forward driving force output and that actuates the sensor portion; and a clutch portion that couples the spool and the lock portion by actuation of the sensor portion.

In the webbing take-up device of the first aspect of the present invention, the forward driving force output from the drive section when the drive section is driven forward is transmitted to the spool and rotates the spool in the take-up direction. The webbing is thereby taken up onto the spool, eliminating any looseness, called slack, in the webbing fitted across the body of an occupant.

The sensor section is actuated in a state of rapid vehicle deceleration when a vehicle is being decelerated with a deceleration of a specific value or greater and/or a state in which the spool is rapidly rotated with an acceleration of a specific value or greater in the pullout direction, opposite to the take-up direction. The actuated sensor section actuates the clutch section. The spool and the lock section are thereby coupled together, and rotation of the spool in the pullout direction is restricted by the lock section. Consequently, webbing is restricted from being pulled out from the spool in this state, and the body of an occupant can be restrained by the webbing as it attempts to move towards the vehicle front under inertia, for example during rapid vehicle deceleration.

In the webbing take-up device of the present invention, as described above, the sensor section is also actuated by forward driving force output from the drive section when the drive section is driven forward. Hence, even when the above other sensor actuation conditions are attained after the drive section has been actuated, rotation of the spool in the pullout direction is speedily restricted during rapid vehicle deceleration since the sensor section has already been actuated and the lock section has already been actuated in this state.

The second aspect of the present invention provides the webbing take-up device of the first aspect, wherein in a coupled state of the spool and the lock portion by the clutch portion, coupling of the lock portion and the spool by the clutch portion is eliminated by output from the drive portion of reverse driving force opposite to the forward driving force.

In the webbing take-up device of the second aspect of the present invention, the drive section is not only capable of outputting forward driving force but is also capable of outputting reverse driving force in the reverse direction opposite to the forward driving force. From a state in which the lock section and the spool are coupled by the clutch section such that rotation force can be transmitted from the spool to the lock section, the clutch section releases the coupling of the lock section and the spool when reverse driving force is output from the drive section.

Accordingly, when conditions requiring forward driving of the drive section to eliminate slack no longer apply, rotation of the spool in the pullout direction can be enabled by reverse driving the drive section, allowing webbing to be pulled out as required and enabling tight restraint by the webbing to be alleviated.

The third aspect of the present invention provides the webbing take-up device of the first aspect, wherein:

the lock portion is interposed between the drive portion and the spool, and enables rotation force output from the drive portion to be transmitted to the spool side; and the clutch portion is interposed between the spool and the lock portion, couples the lock portion and the spool accompanying actuation of the sensor portion, and actuates the sensor portion by output from the drive portion of forward driving force.

In the webbing take-up device of the third aspect of the present invention, the lock section is interposed between the drive section and the spool and the clutch section is interposed between the spool and the lock section.

The clutch section is actuated when forward driving force is output from the drive section, the sensor section is actuated by the clutch section, and the clutch section couples the spool and the lock section together by actuation of the sensor section. The driving force output from the drive section rotates the spool in the take-up direction due to the lock section transmitting forward driving force from the drive section to the spool side.

However, when the sensor section is actuated by either a rapid vehicle deceleration state or a rapid spool rotation state, the clutch section couples together the spool and the lock section as described above. If the spool coupled to the lock section attempts to rotate in the pullout direction, the rotation force is input to the lock section and the lock section counters the rotation force in the pullout direction, thereby restricting rotation of the spool in the pullout direction. Consequently, the webbing is restricted from being pulled out from the spool in this state, and the body of an occupant attempting to move towards the vehicle front under inertia, for example during rapid vehicle deceleration, is restrained by the webbing.

The clutch section actuates the sensor section with forward driving force output from the drive section. Hence even when other sensor actuation conditions are attained after the drive portion has been actuated, the lock portion is actuated speedily during rapid vehicle deceleration since in this state the sensor portion has already been actuated and the spool and the lock portion already coupled together.

Incidentally, in the webbing take-up device described in JP-A No. 2006-282097 a clutch mechanism is provided between the spool and the output shaft of a motor. When rotation force imparted to the spool in the pullout direction is a specific value or greater a torque limiter configuring the clutch mechanism is actuated, preventing excessive rotation force being transmitted to the motor output shaft side by releasing the pullout direction rotation force, or by separating coupling between the spool and the output shaft of the motor in the clutch mechanism.

In contrast, in the webbing take-up device of the present invention the clutch portion linking the lock portion and the spool also serves as a clutch linking the spool to the drive portion. Accordingly, the configuration for linking the lock portion and the spool can be provided common to the configuration for liking the spool and the drive portion, enabling a reduction in the number of components and consequently enabling a reduction in cost to be achieved.

Furthermore, due to the clutch portion linking the lock portion to the spool also serving as a clutch linking the spool and the drive portion, even when rotation force in the pullout direction is transmitted from the spool, there is no need to eliminate coupling between the spool and the drive portion in the clutch portion, and there is no need for a configuration in the clutch portion to eliminate coupling between the spool and the drive portion when rotation force in the pullout direction is transmitted to the clutch portion from the spool.

Furthermore, due to the clutch portion linking the lock portion and the spool together in a state in which the lock portion restricts rotation of the spool in the pullout direction, sufficient mechanical strength can be imparted to counter rotation force in the pullout direction transmitted from the spool, namely, when rotation force to the spool occurs in the pullout direction when the body of an occupant pulls on the webbing during rapid vehicle deceleration. Consequently, configuration (a temporary clutch release mechanism) is also not required to release rotation force when rotation force is input in the pullout direction in this manner even though the clutch portion is configured to link together the spool and the drive portion.

The fourth aspect of the present invention provides the webbing take-up device of the first aspect further including:

a first rotation body on the transmission path of driving force from the drive portion, further to the spool side than the lock portion, and provided relatively rotatable with respect to the spool, the first rotation body being restricted by the lock portion from rotation in the pullout direction when the lock portion is actuated; and an energy absorbing member that is provided straddling between the spool and the first rotation body, restricts relative rotation of the spool with respect to the first rotation body, and deforms when a rotation force of a specific value or greater is imparted to spool in a state in which rotation of the first rotation body is restricted by the lock portion.

According to the fourth aspect of the present invention, the first rotation body is provided capable of rotation relative to the spool. More specifically, by providing the energy absorbing member so as to straddle between the spool and the first rotation body, relative rotation of the first rotation body with respect to the spool is restricted by the energy absorbing member, and rotation of the spool in the pullout direction is also restricted by rotation of the first rotation body in the pullout direction being restricted by the lock portion.

However, in a state in which rotation of the first rotation body in the pullout direction is thus restricted by the clutch portion, deformation occurs in the energy absorbing member when a rotation force is imparted to the spool of a specific value or greater. The spool is able to rotate in the pullout direction by the amount of deformation of the energy absorbing member, and webbing is pulled out from the spool of a length corresponding to the amount of rotation. Accordingly, a portion of the force attempting to rotate the spool in the pullout direction, namely the tensional force applied to the webbing, is absorbed by deformation of the energy absorbing member.

In the webbing take-up device of the present invention the sensor portion is actuated by output of forward driving force from the drive portion, thereby coupling together the first rotation body and the lock portion. Hence if the drive portion has been forward driven prior to rapid vehicle deceleration, the first rotation body and the lock portion have already been coupled together rapid vehicle deceleration occurs, and hence tensional force imparted to the webbing in this state by the body of an occupant attempting to move towards the vehicle front under inertia during rapid vehicle deceleration can immediately be utilized for deformation of the energy absorbing member.

However, any slack of the webbing in the spool is eliminated by forward driving from the drive portion since the spool is rotated in the take-up direction to take-up the webbing by forward driving force from the drive portion. Accordingly, after such a state has been achieved, tensional force imparted to the webbing from the body of an occupant when rapid vehicle deceleration occurs is imparted to the spool as rotation force in the pullout direction without the tensional force first being employed to tighten winding of the webbing on the spool. This means that tensional force imparted to the webbing can be immediately utilized for deformation of the energy absorbing member.

The fifth aspect of the present invention provides the webbing take-up device of the fourth aspect further including:

a second rotation body provided so as to be capable of relative rotation with respect to the spool; and a following biasing member that is interposed between the second rotation body and the spool, and biases the second rotation body towards restricting relative rotation of the second rotation body with respect to the spool such that the following biasing member causes the spool or the second rotation body to follow rotation of the other member of the spool or the second rotation body, wherein, the sensor portion is configured such that the second rotation body becomes capable of relative rotation with respect to the spool against biasing force of the following biasing member when the second rotation body is rotated at an acceleration of a specific value or greater corresponding to the rapid rotation state; and the clutch portion including:
a third rotation body that rotates when transmitted with driving force from the drive portion,
a first clutch member that connects the third rotation body to the second rotation body when forward driving force is transmitted to the third rotation body and rotates the second rotation body with an acceleration of the specific value or greater, and
a second clutch member that connects the spool to the third rotation body when the spool has been relatively rotated in the pullout direction with respect to the second rotation body against biasing force of the following biasing member.

In the webbing take-up device of the fifth aspect of the present invention, the second rotation body configuring the sensor portion is capable of rotation relative to the spool. However, biasing force from the following biasing member interposed between the second rotation body acts so as to restrict relative rotation of the second rotation body with respect to the spool. This results in one member of the spool or the second rotation body following rotation of the other. Consequently, since the second rotation body follows the spool during normal pulling out of the webbing from the spool and take-up of the webbing on the spool, there is basically no actuation of the sensor portion under such conditions.

When the third rotation body configuring the clutch portion rotates due to forward driving force output from the drive portion, the first clutch member configuring the clutch portion is actuated, the third rotation body of the clutch portion and the second rotation body of the sensor portion are linked together, and the second rotation body is rotated with an acceleration corresponding to the rapid rotation state of the spool being rotated in the pullout direction with an acceleration of a specific magnitude or greater.

When the second rotation body rotates in this manner, the second rotation body rotates in the take-up direction with respect to the spool against biasing force of the following biasing member (namely the spool relatively rotates in the pullout direction with respect to the second rotation body). The second clutch member of the clutch portion is actuated when relative rotation of the second rotation body with respect to the spool occurs, linking the spool and the third rotation body together. Rotation of the third rotation body, namely forward driving force of the drive portion, is thereby transmitted to the spool, and the spool is rotated in the take-up direction.

When the spool rotates in the take-up direction, biasing force of the following biasing member attempts to rotate the second rotation body in the pullout direction. However, if the spool is rotated in the pullout direction with an acceleration of a specific magnitude or greater, although biasing force from the following biasing member attempts to make the second rotation body follow rotation of the spool, the second rotation body becomes unable to follow the spool against the biasing force of the following biasing member, resulting in relative rotation of the spool in the pullout direction with respect to the second rotation body.

Since relative rotation of the spool in the pullout direction with respect to the second rotation body, and relative rotation of the second rotation body in the take-up direction with respect to the spool are in fact the same rotation direction when one or other of the spool or the second rotation body is viewed from the other, relative rotation of the spool in the pullout direction with respect to the second rotation body actuates the second clutch member of the clutch portion to link the spool and the third rotation body together. Rotation of the spool in the pullout direction is thereby transmitted to the lock portion through the third rotation body, namely though the clutch portion.

The lock portion counters this rotation force in the pullout direction, and restricts rotation of the spool in the pullout direction. Consequently, in this state webbing is restricted from being pulled out from the spool, and the body of an occupant attempting to move towards the vehicle front, for example during rapid vehicle deceleration, can be restrained by the webbing.

The sixth aspect of the present invention provides the webbing take-up device of the fourth aspect, wherein the lock portion including:

a worm gear that rotates under driving force output from the drive portion; and a worm wheel that meshes with the worm gear and rotates under transmission of rotation of the worm gear, the worm wheel configured such that rotation of the worm gear is transmittable to the clutch portion and rotation due to rotation force transmitted from the clutch portion side is restricted by the worm gear.

The webbing take-up device of the sixth aspect of the present invention includes an energy absorbing member provided so as to straddle between the second rotation body and the spool. The energy absorbing member is anchored to the second rotation body. The lock portion is provided configured by a worm gear and a worm wheel that meshes with the worm gear. The driving force output from the drive portion is transmitted to the worm gear, and when the worm gear rotates the worm wheel meshed with the worm gear also rotates. Rotation of the worm wheel is eventually transmitted to the spool, resulting in the spool being rotated in the take-up direction.

However, in the rotation transmission mechanism configured by the worm gear and the worm wheel, the worm wheel is not capable of transmitting rotation to the worm gear even if rotation is transmitted to the worm wheel from the opposite side to that of the worm wheel, and the worm wheel does not rotate. Hence rotation force from the spool in the pullout direction cannot cause rotation of the worm wheel even when rotation force is transmitted to the worm wheel through the clutch portion, and so the spool cannot be rotated in the pullout direction.

In the webbing take-up device according to the present invention a two member configuration of a worm gear and worm wheel is employed to realize a configuration that can transmit driving force output from the drive portion to the spool in order to the rotate the spool, and that can restrict transmission of rotation force from the spool and restrict rotation of the spool in the pullout direction.

As explained above, in the webbing take-up device according to the present invention, there is no need to rotate the spool in the pullout direction in the interval from when a rapid vehicle deceleration state occurs and/or when a rapid rotation state of the spool in the pullout direction occurs up until rotation of the spool in the pullout direction is restricted.

BRIEF DESCRIPTION OF THE DRAWINGS

An exemplary embodiment of the present invention will be described in detail based on the following figures, wherein.

DETAILED DESCRIPTION

Explanation follows regarding exemplary embodiments of the present invention, with reference to FIG. 1 to FIG. 6.

Configuration of Present Exemplary Embodiment

Figure 1:
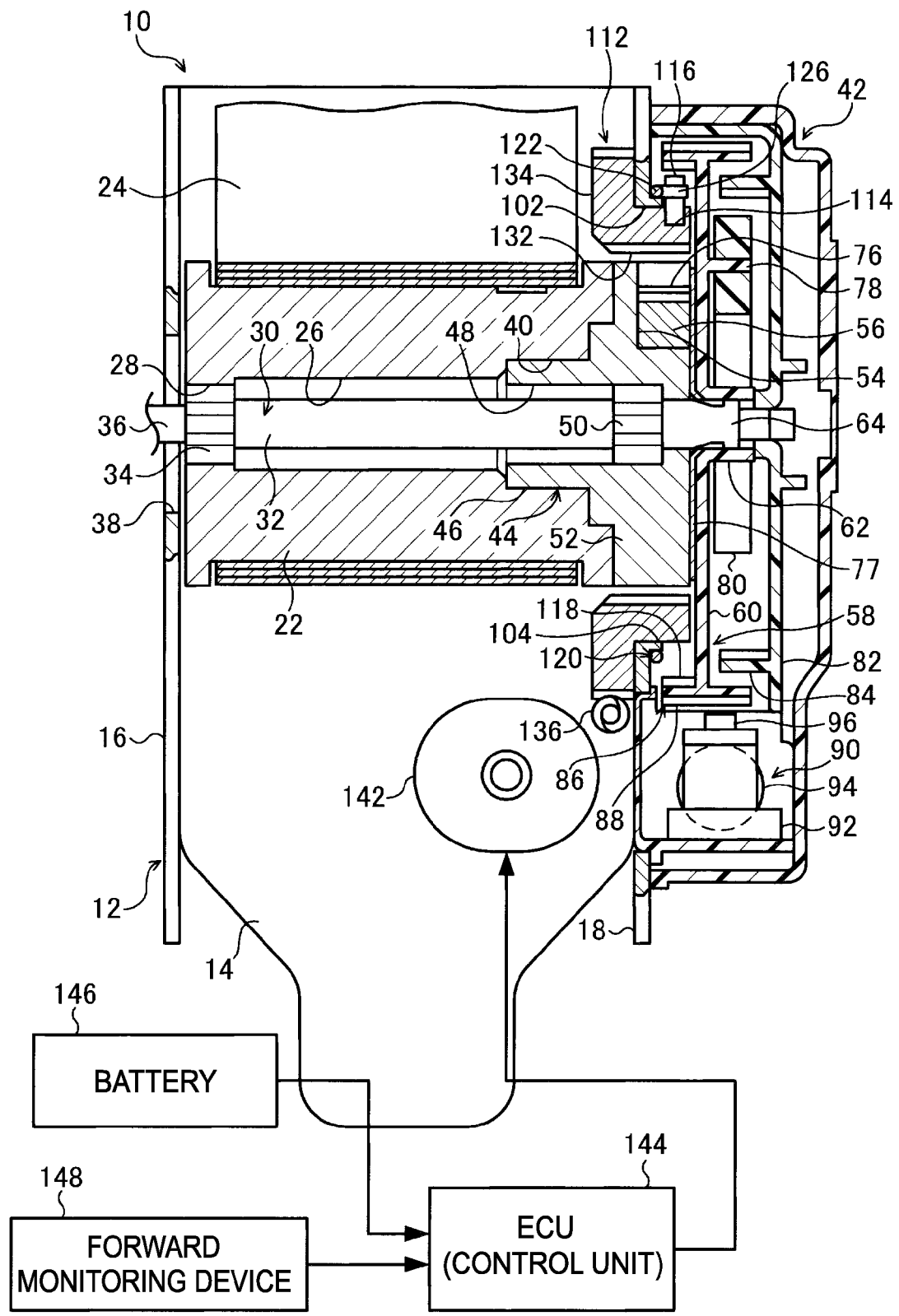
FIG. 1 is a face-on cross-section schematically illustrating a configuration of relevant portions of a webbing take-up device according to an exemplary embodiment of the present invention.

FIG. 1 schematically illustrates a configuration of a webbing take-up device 10 according to the present exemplary embodiment, as viewed in a face-on cross-section.

As shown in FIG. 1, the webbing take-up device 10 is equipped with a frame 12. The frame 12 is a substantially flat plate shape provided with a back plate 14. The webbing take-up device 10 is mounted to a vehicle by fixing the back plate 14 at a specific location on the vehicle. A flat plate shaped leg plate 16 extends from one end portion in the width direction of the back plate 14 out towards one side in the back plate 14 thickness direction. A flat plate shaped leg plate 18 extends from the other width direction end portion of the back plate 14 out towards the same side in the back plate 14 thickness direction, so as to face the leg plate 16.

A spool 22 is disposed between the leg plate 16 and the leg plate 18. The spool 22 is formed in a substantially circular pillar shape with an axial direction that runs along the facing direction of the leg plate 16 and the leg plate 18. A length direction base end portion of long strip shaped webbing 24 is anchored to the spool 22, and the webbing 24 is wound from its length direction base end portion in a layered shape onto the outer peripheral portion of the spool 22 by rotation of the spool 22 about its central axis. The spool 22 rotates in a pullout direction opposite to the take-up direction when the leading end side of the webbing 24 is pulled and the webbing 24 wound on the spool 22 is pulled out.

A housing hole 26 is formed substantially coaxially in the spool 22. The end portion of the housing hole 26 on the 16 side is connected to a fitting insertion hole 28. The fitting insertion hole 28 has a non-circular internal peripheral profile, such as a star or hexagonal shape. The end portion of the spool 22 is open on the leg plate 16 side. A torsion shaft 30 serving as an energy absorbing member is provided inside the housing hole 26.

The torsion shaft 30 is provided with a torsion shaft main body 32 that is bar shaped and has an axial direction that runs along the axial direction of the spool 22. The end portion of the torsion shaft main body 32 on the leg plate 16 side is formed with a spool-side coupling portion 34. The spool-side coupling portion 34 has an external peripheral profile of similar non-circular shape to the inner peripheral profile of the fitting insertion hole 28. Relative rotation of the torsion shaft 30 with respect to the spool 22 is restricted by the spool-side coupling portion 34 fitting into the fitting insertion hole 28 (relative rotation of the torsion shaft 30 with respect to the spool 22 is rendered practically impossible).

An axial portion 36 is formed coaxially to the spool 22 at the end portion of the spool-side coupling portion 34 on the opposite side to the torsion shaft main body 32. The axial portion 36 projects out through a hole 38 formed in the leg plate 16 towards the outside of the frame 12 and is rotatably supported at the outside of the frame 12 by the inside of a spring case and the like attached to the leg plate 16.

A fitting hole 40 is formed in the spool 22 further to the leg plate 18 side than the axial direction central portion of the spool 22. The fitting hole 40 is formed with a circular shape coaxial to the spool 22 when the fitting hole 40 is viewed along the spool 22 axial direction. One end of the fitting hole 40 is connected to the housing hole 26, and the other end of the fitting hole 40 is open on the leg plate 18 side of the spool 22. A fitting portion 46 of a pawl base 44 serving as a first rotation body is inserted into and projects out from the open end of the fitting hole 40 on the leg plate 18 side.

The external peripheral profile of the fitting portion 46 is an equivalent circular shape to the inner peripheral profile of the fitting hole 40. The pawl base 44 is relative rotatable coaxially with respect to the spool 22 in a state in which the fitting portion 46 is inserted into the fitting hole 40. A fitting hole 48 is formed to the pawl base 44. The fitting hole 48 has a non-circular inner peripheral profile such as a star or hexagonal shape, and opens at the leading end of the fitting portion 46 (the end portion of the leg plate 16 side).

A pawl-base-side coupling portion 50 is formed to the end portion of the torsion shaft main body 32 at the opposite side to the spool-side coupling portion 34. The pawl-base-side connection portion 50 corresponds to the fitting hole 48, and is inserted inside the fitting hole 48. The pawl-base-side coupling portion 50 has a similar non-circular external peripheral profile to the fitting hole 48, and accordingly relative rotation of the pawl base 44 with respect to the torsion shaft 30 is restricted (relative rotation of the pawl base 44 with respect to the torsion shaft 30 is rendered practically impossible).

A pawl base main body 52 is provided to the pawl base 44. The pawl base main body 52 is formed coaxially with respect to the fitting portion 46, and faces towards the end face of the spool 22 on the leg plate 18 side. A pawl housing portion 54 is formed in the pawl base main body 52. The pawl housing portion 54 opens at a portion on the outer periphery of the pawl base main body 52, opening at the end portion of the pawl base main body 52 on the opposite side to the spool 22. A pawl 56 configuring a clutch portion and serving as a first clutch member is housed inside the pawl housing portion 54. A V-gear 58 configuring a sensor portion and serving as a second rotation body is provided at the opposite side of the pawl base main body 52 to the spool 22.

A circular plate portion 60 of circular plate shape is provided to the V-gear 58. A circular cylindrical shaped boss 62 is formed at the center of the circular plate portion 60. A through hole is formed in the circular plate portion 60 coaxially to the inner peripheral portion of the boss 62. A shaft portion 64 is formed to the torsion shaft 30 so as to correspond to the through hole of the circular plate portion 60 and the boss 62. The shaft portion 64 is formed projecting out from the end portion of the pawl-base-side coupling portion 50 on the opposite side to the torsion shaft main body 32 and passes out through the pawl base 44. The shaft portion 64 also passes through the through hole and the boss 62 of the circular plate portion 60. The boss 62, and hence also the V-gear 58, is accordingly supported by the shaft portion 64 so as to be capable of rotation about the shaft portion 64.

Figure 2:
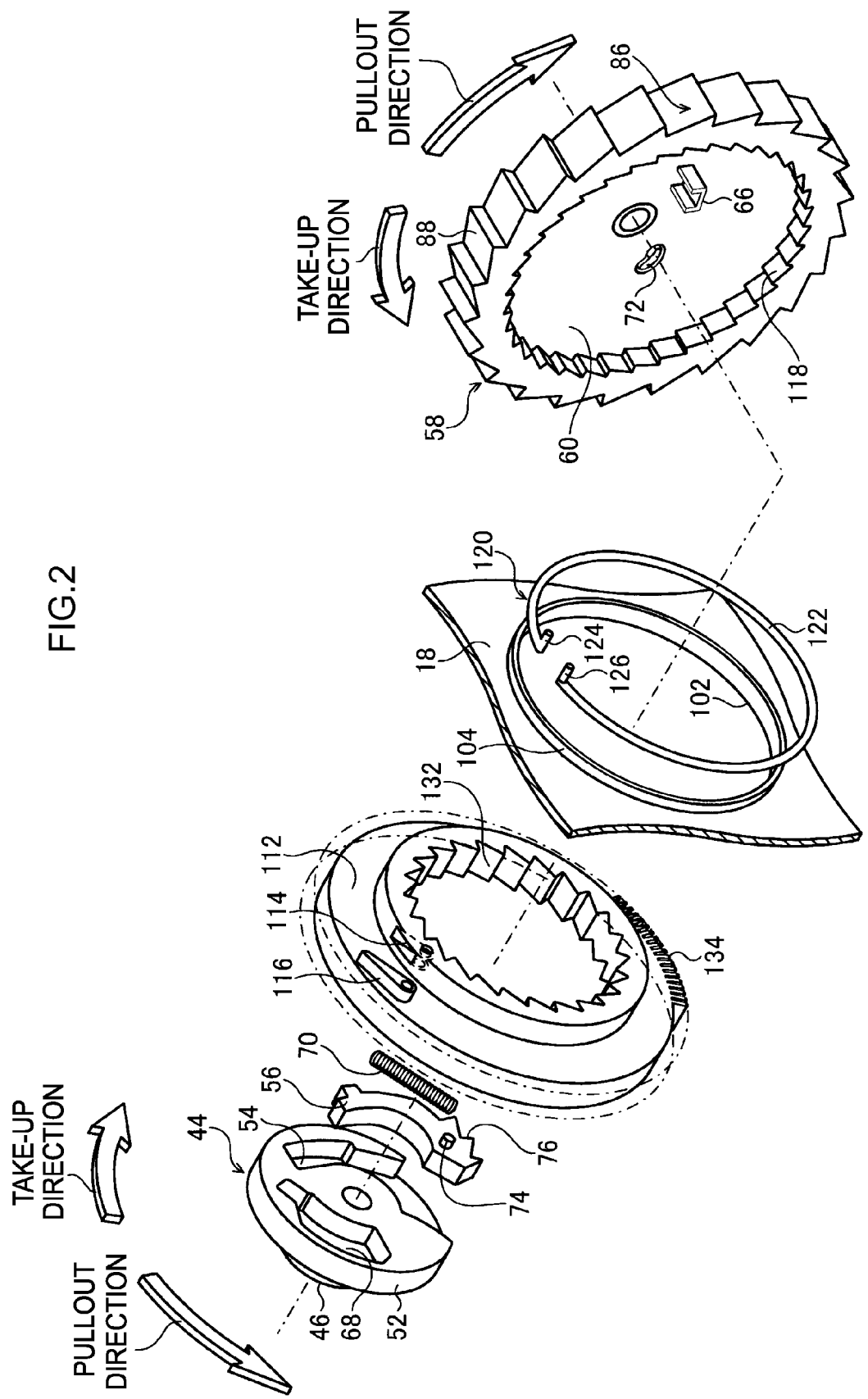
FIG. 2 is an exploded perspective diagram illustrating relevant portions of a webbing take-up device according to an exemplary embodiment of the present invention.

As shown in FIG. 2, a spring anchor wall 66 is formed on the face of the circular plate portion 60 on the pawl base 44 side. A spring housing portion 68 is formed in the pawl base main body 52 of the pawl base 44 so as to correspond to the spring anchor wall 66. The spring housing portion 68 is open at the end portion of the pawl base main body 52 on the opposite side to the fitting portion 46, and the spring anchor wall 66 is inserted inside the spring housing portion 68.

Figure 3:
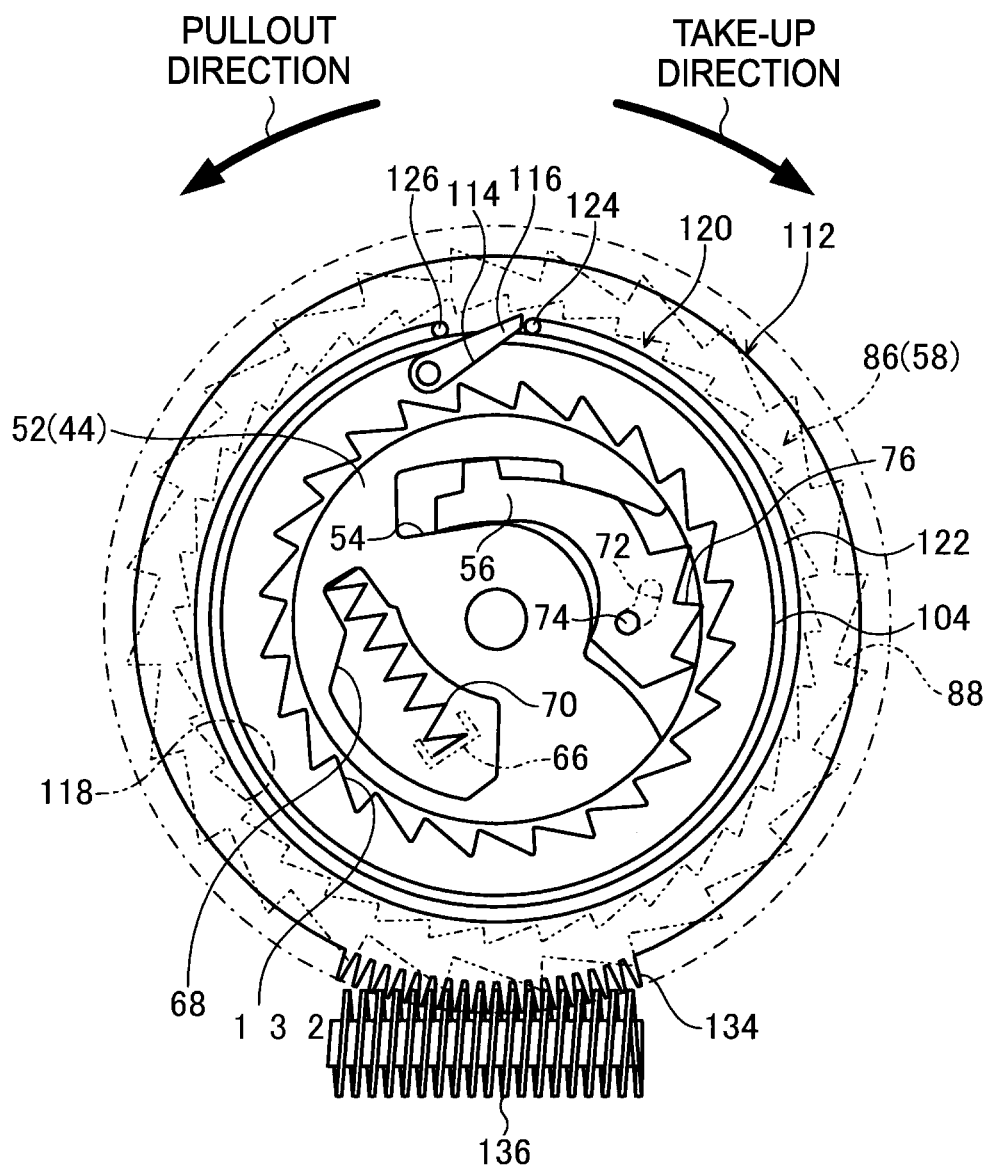
FIG. 3 is a side view schematically illustrating a configuration of relevant portions of a webbing take-up device according to an exemplary embodiment of the present invention.

A compression coil spring 70 configuring the sensor portion is provided as a following biasing member inside the spring anchor wall 66. As shown in FIG. 3, a first end of the compression coil spring 70 presses against the inside wall of the pawl housing portion 54, and the second end of the compression coil spring 70 presses against the spring anchor wall 66 inserted into the spring housing portion 68. The inside wall of the pawl housing portion 54 presses the end of the compression coil spring 70 so as to attempt to compress the compression coil spring 70 when the pawl base 44 rotates in the pullout direction with respect to the V-gear 58. The second end of the compression coil spring 70 accordingly presses the spring anchor wall 66 in the pullout direction so as to rotate the V-gear 58 in the pullout direction.

When the V-gear 58 is rotated in the take-up direction with respect to the pawl base 44, the spring anchor wall 66 presses the second end of the compression coil spring 70 in the take-up direction so as to compress the compression coil spring 70. The first end of the compression coil spring 70 accordingly presses the inside wall of the pawl housing portion 54 in the take-up direction, rotating the pawl base 44 in the take-up direction. Accordingly a configuration is achieved in which the V-gear 58 is rotatably supported by the shaft portion 64 so as to be relatively rotatable with respect to the pawl base 44. The compression coil spring 70 interposed between the pawl base 44 and the V-gear 58 causes one or other of the pawl base 44 or the V-gear 58 to perform following rotation with respect to the other of the pawl base 44 and the V-gear 58.

As shown in FIG. 2 and FIG. 3, a guide hole 72 is formed in the circular plate portion 60 of the V-gear 58. The guide hole 72 is an elongated hole that either bends at an intermediate portion in the length direction or is curved, and is open at least to the face of the circular plate portion 60 facing the pawl base main body 52. A guide pin 74 formed to the pawl 56 is inserted into the guide hole 72. The external diameter dimension of the guide pin 74 is set with a dimension that is slightly smaller than the internal width dimension of the guide hole 72. The guide pin 74 is hence guided by the guide hole 72 and capable of moving along the length direction of the guide hole 72 between one end and the other.

Movement of the pawl 56 is restricted by interaction between the inner wall of the pawl housing portion 54 and the pawl 56 housed inside the pawl housing portion 54. When the pawl base 44 has been relatively rotated in the pullout direction with respect to the V-gear 58 (namely when the pawl base 44 has been rotated in the pullout direction with respect to the V-gear 58, or when the V-gear 58 has been rotated in the take-up direction with respect to the pawl base 44) and the guide pin 74 has moved guided by the guide hole 72, the pawl 56 inside the pawl housing portion 54 moves such that ratchet teeth 76 on the leading end of the pawl 56 project outside of the pawl base main body 52 from the opening of the pawl housing portion 54 in an external peripheral portion of the pawl base main body 52.

As shown in FIG. 1 (omitted from illustration in FIG. 2 to FIG. 6), a cover plate 77 is also provided to the pawl base main body 52 on the opposite side to the fitting portion 46. The cover plate 77 closes off the pawl housing portion 54 and the spring housing portion 68 from the opposite side of the pawl base main body 52 to the fitting portion 46, thereby preventing the pawl 56 from falling out of the pawl housing portion 54, and the compression coil spring 70 from falling out of the spring housing portion 68. More precisely, perforation holes, cutouts and the like are appropriately formed in the cover plate 77 such that the spring anchor wall 66 and the guide pin 74 are able to pass through such perforation holes and cutouts to enable operation as described above.

As shown in FIG. 1, a support pin 78 is formed out from the face of the circular plate portion 60 on the opposite side to the pawl base 44. The support pin 78 is formed projecting out towards the same direction as the central axis of the leg plate 18 from a position distanced in the radial direction from the center of the circular plate portion 60. A W-pawl 80, configuring a "WSIR mechanism" and configuring the sensor portion of the present invention, is supported by the support pin 78 so as to be capable of swinging about the support pin 78. The periphery of the V-gear 58 is covered by a sensor holder 82. A ratchet gear 84 is formed to the sensor holder 82 in a ring shape with internal teeth. When the W-pawl 80 rotates in the take-up direction about the support pin 78 relative to the V-gear 58, the ratchet portion formed to the W-pawl 80 meshes with the ratchet gear 84 such that rotation of the V-gear 58 in the pullout direction is restricted.

A ring shaped ratchet gear portion 86 is formed to the V-gear 58 at the external peripheral portion of the circular plate portion 60. An external tooth ratchet gear 88 is formed to an external peripheral portion of the ratchet gear portion 86. An acceleration sensor 90 configuring a "VSIR" and configuring the sensor portion of the present invention is provided below the ratchet gear 88. A mounting portion 92 is provided to the acceleration sensor 90. The mounting portion 92 is formed with sloping faces of a bowl shape opening towards the top, and an inertia ball 94 is mounted on the inside of the sloping faces.

An engagement claw 96 is supported from the mounting portion 92 above the inertia ball 94 such that the engagement claw 96 is capable of swinging up or down. The inertia ball 94 pushes up the engagement claw 96 when the inertia ball 94 moves up the sloping faces under inertia occurring during rapid vehicle acceleration. The engagement claw 96 pushed up in this manner engages with the ratchet gear 88 of the V-gear 58, thereby restricting rotation of the ratchet gear portion 86 (namely the V-gear 58) in the pullout direction.

As shown in FIG. 1 and FIG. 2, a circular hole 102 is formed in the leg plate 18 coaxially to the spool 22. A support ring 104 is also formed to the leg plate 18 on the opposite face to that of the leg plate 16. The support ring 104 is formed in a ring shape with an internal diameter dimension equivalent to the internal diameter dimension of the circular hole 102 and is also formed coaxially to the circular hole 102. As shown in FIG. 1, a gear ring 112 configuring the clutch portion and serving as a third rotation body is rotatably supported at the circular hole 102 and the support ring 104.

One axial direction end of the gear ring 112 projects out further to the outside of the leg plate 18 than the leading end of the support ring 104, and is inserted inside the ratchet gear portion 86 further to the leg plate 18 side than the circular plate portion 60. A pawl housing portion 114 is formed in the gear ring 112 further to the outside of the leg plate 18 than the leading end of the support ring 104. The pawl housing portion 114 is open at an external peripheral portion of the gear ring 112. A clutch pawl 116 configuring the clutch portion and serving as a first clutch member is housed at the inside of the gear ring 112 so as to be capable of swinging about the axial direction of the clutch pawl 116 running along the same direction as the central axial line of the spool 22.

The leading end side of the clutch pawl 116 projects out from an external portion of the pawl housing portion 114. When the clutch pawl 116 rotates about its base end side in the pullout direction the leading end of the clutch pawl 116 approaches the vicinity of the inner peripheral portion of the ratchet gear portion 86. A ratchet gear 118 is formed to an inner peripheral portion of the ratchet gear portion 86 so as to correspond to the leading end of the clutch pawl 116. The leading end of the clutch pawl 116 meshes with the ratchet gear 118 when the clutch pawl 116 rotates in the take-up direction and the leading end of the clutch pawl 116 approaches the vicinity of the inner peripheral portion of the ratchet gear portion 86. Relative rotation of the V-gear 58 with respect to the gear ring 112 in the pullout direction (namely relative rotation of the V-gear 58 in the pullout direction relative to the gear ring 112 or relative rotation of the gear ring 112 in the take-up direction with respect to the V-gear 58) is restricted when there is a meshed state between the leading end of the clutch pawl 116 and the ratchet gear 118.

A friction spring 120 is fitted to the support ring 104. As shown in FIG. 2, the friction spring 120 is provided with a spring main body 122. The spring main body 122 is formed in a ring shape with a portion cut-out (is substantially C-shaped) and is set with an internal diameter dimension when in a substantially unloaded state that is the same as the external diameter dimension of the support ring 104, or smaller than the external diameter dimension of the support ring 104.

Accordingly, in a fitted state of the friction spring 120 to the external portion of the support ring 104, the inner peripheral portion of the spring main body 122 presses against the external peripheral portion of the support ring 104, and the friction spring 120 rotates about the support ring 104 when rotation force is applied to the friction spring 120 exceeding frictional force (maximum static frictional force) between the external peripheral portion of the support ring 104 and the inner peripheral portion of the spring main body 122 with the support ring 104 at the center.

An engaging portion 124 projects out from one circumferential direction end of the spring main body 122 towards the opposite side to the leg plate 18. The engaging portion 124 faces the clutch pawl 116 from the take-up side, and the engaging portion 124 interacts with the clutch pawl 116 when the gear ring 112 rotates in the take-up direction. When, with the engaging portion 124 in an interacting state, the gear ring 112 rotates further in the take-up direction, the clutch pawl 116 rotates in the pullout direction with respect to the gear ring 112, and the leading end of the clutch pawl 116 meshes with the ratchet gear 118.

An engaging portion 126 extends out towards the opposite side to the leg plate 18 from the other circumferential direction end of the gear ring 112. The engaging portion 126 faces the clutch pawl 116 from the pullout direction and the engaging portion 126 interacts with the clutch pawl 116 when the gear ring 112 rotates in the pullout direction. When, with the engaging portion 126 in an interacting state, the gear ring 112 rotates further in the pullout direction, the clutch pawl 116 rotates in the take-up direction with respect to the gear ring 112 and the leading end of the clutch pawl 116 separates away from the ratchet gear 118.

A ratchet gear 132 is formed to the inner peripheral portion of the gear ring 112. The ratchet gear 132 is capable of being meshed with by the ratchet teeth 76 of the pawl 56. The ratchet teeth 76 mesh with the ratchet gear 132 when the pawl 56 projects out from the opening in the pawl housing portion 54 at an external peripheral portion of the pawl base main body 52. Relative rotation of the gear ring 112 with respect to the pawl base 44 in the take-up direction (namely rotation of the gear ring 112 in the take-up direction with respect to the pawl base 44 or rotation of the pawl base 44 in the pullout direction with respect to the 112) is restricted when the ratchet teeth 76 are in a meshed state with the ratchet gear 132.

The gear ring 112 projects out further to the leg plate 16 side from the leg plate 18, and the portion of the gear ring 112 projecting out further to the leg plate 16 side than the leg plate 18 is configured with a worm wheel 134 configuring a lock portion. The worm wheel 134 is configured coaxial with respect to the circular hole 102, and configuring the lock portion together with the worm wheel 134 there is also a worm gear 136 disposed below the worm wheel 134. The worm gear 136 meshes with the worm wheel 134. The worm gear 136 is mechanically coupled through gears, not shown in the drawings, to an output shaft of a motor 142 serving as a drive portion disposed between the leg plate 16 and the leg plate 18. The worm gear 136 rotates when the motor 142 is actuated to rotate the output shaft of the motor 142. The worm wheel 134 rotates when rotation of the worm gear 136 is transmitted to the worm wheel 134.

Rotation of the worm gear 136 can be transmitted to the worm wheel 134 using this mechanism for transmitting rotation force using the worm gear 136 and the worm wheel 134, however rotation of the worm wheel 134 cannot be transmitted to rotation of the worm gear 136, and the worm wheel 134 is accordingly restrained by the worm gear 136. The present exemplary embodiment utilizes this characteristic to achieve a configuration in which rotation of the spool 22 is restricted when rotation force is applied to the spool 22 in the pullout direction with the ratchet teeth 76 in a meshed state with the ratchet gear 132.

Accordingly, in the present exemplary embodiment, sufficient mechanical strength is provided by the ratchet teeth 76 of the pawl 56 and the ratchet gear 132 of the gear ring 112, and also by the worm wheel 134 and the worm gear 136 in the gear ring 112, to counter rotation force imparted to the spool 22 by the body of an occupant pulling on the webbing 24 when rapid vehicle deceleration occurs (and also when the travelling vehicle has impacted a forward obstruction).

The motor 142 is electrically connected to an ECU 144 serving as a control portion. The ECU 144 is electrically connected to a battery 146 and the motor 142 is driven under control from the ECU 144. The ECU 144 is electrically connected to a forward monitoring device 148 that emits radar waves or infrared radiation, for example, forwards of the vehicle and detects distance between the vehicle and any obstacles in front of the vehicle based on the time taken for the emitted radar waves or infrared radiation to return after reflection from the obstacle.

Operation and Effect of the Present Exemplary Embodiment

Explanation follows regarding operation of the webbing take-up device 10, with reference to FIG. 3 to FIG. 6. The operation and effect of the present exemplary embodiment is explained from the operational perspective through explanation of the operation of the webbing take-up device 10.

Forward Obstacle Detection

FIG. 3 shows an initial state of the webbing take-up device 10 during vehicle travel. In this state the forward monitoring device 148 detects distance between the vehicle and an obstacle in front of the vehicle (including distances to other vehicles travelling in front of the vehicle). The ECU 144 drives the motor 142 forwards when the forward monitoring device 148 detects that the distance between the vehicle and an obstacle in front of the vehicle has become less than a specific value. When the worm gear 136 is rotated by the forward driving force output from the motor 142, the worm gear 136 in turn rotates the worm wheel 134, namely the gear ring 112, in the take-up direction. The leading end side of the clutch pawl 116 inside the pawl housing portion 114 makes contact with the engaging portion 124 when the gear ring 112 is rotated in the take-up direction.

Figure 4:
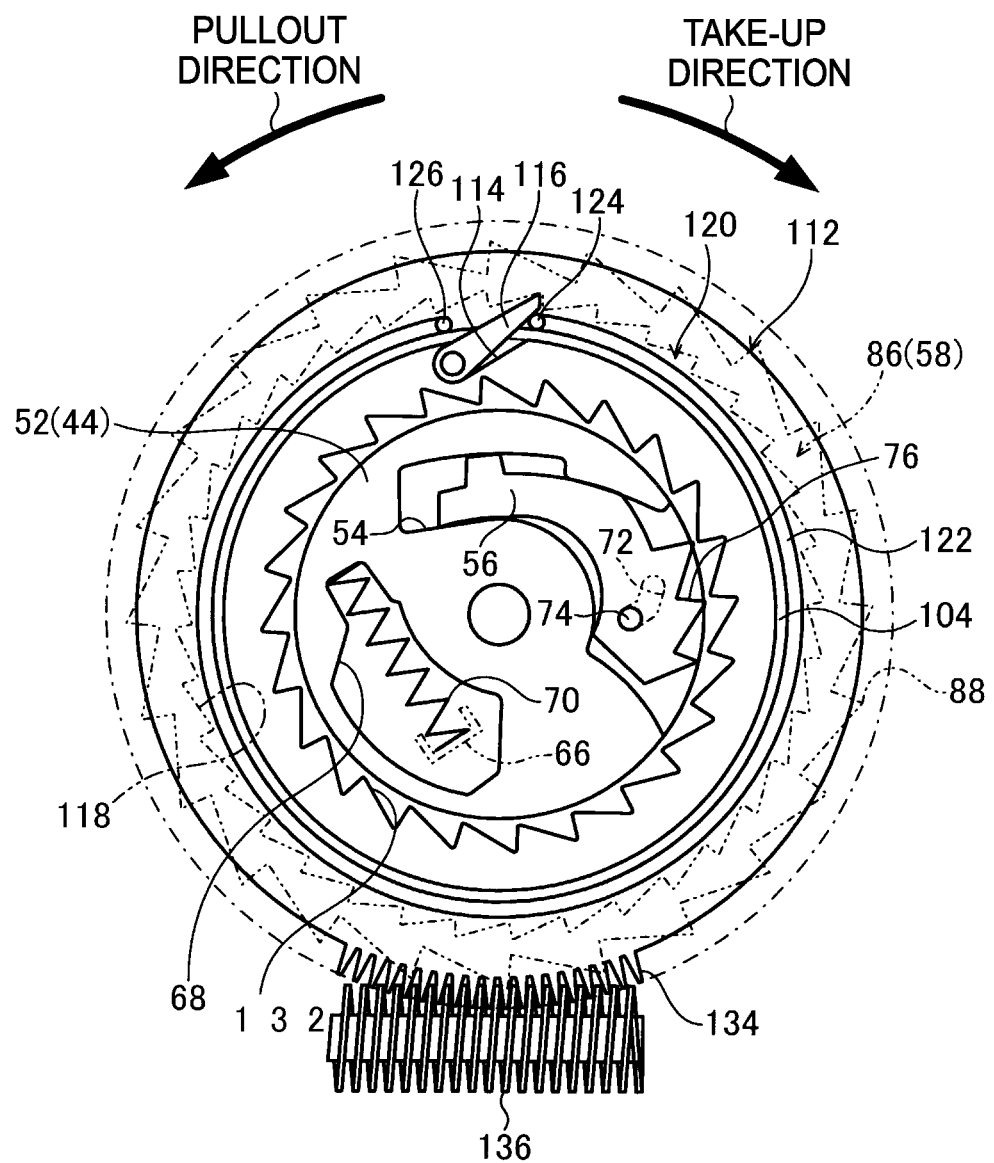
FIG. 4 is a side view corresponding to FIG. 3 and illustrates a state in which a second clutch member has rotated in the take-up direction from the state shown in FIG. 3 linking together the second rotation body and a first rotation body.

In this state, when the gear ring 112 rotates further in the take-up direction, the clutch pawl 116 is rotated in the pullout direction about the base end side of the clutch pawl 116, and, as shown in FIG. 4, the leading end of the clutch pawl 116 meshes with the ratchet gear 118 of the V-gear 58. The rotation force of the gear ring 112 in the take-up direction is accordingly transmitted to the V-gear 58, rotating the V-gear 58 in the take-up direction. The spring anchor wall 66 presses the compression coil spring 70 in the take-up direction when the V-gear 58 rotates in the take-up direction.

The compression coil spring 70 pressed by the spring anchor wall 66 in turn presses the internal wall of the spring housing portion 68 in the take-up direction, rotating the pawl base 44 in the take-up direction. Since the pawl base 44 is coupled through the torsion shaft 30 to the spool 22 in a state in which relative rotation of the pawl base 44 with respect to the spool 22 is restricted, rotation in the take-up direction is transmitted to the spool 22 and the spool 22 is rotated in the take-up direction.

Figure 5:
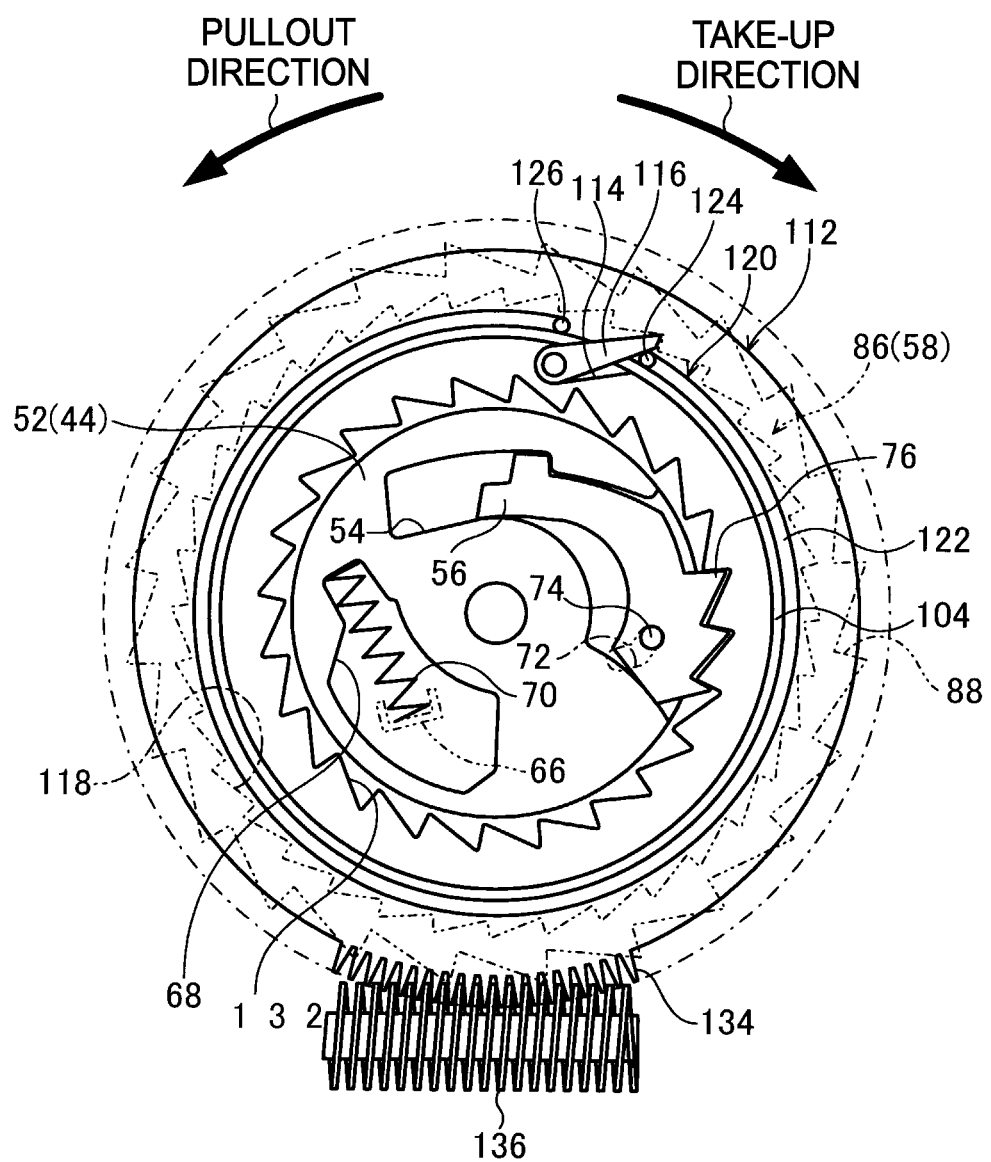
FIG. 5 is a side view corresponding to FIG. 4 and illustrates a state in which relative rotation has occurred of a first rotation body with respect to the spool from the state shown in FIG. 4 and the spool and the second rotation body have been linked together by the first clutch member.

When the spring anchor wall 66 presses the compression coil spring 70 in the take-up direction due to rotation of the V-gear 58 in the take-up direction as described above, the compression coil spring 70 is compressed and the V-gear 58 is rotated in the take-up direction relative to the pawl base 44. The guide pin 74 is guided by the guide hole 72 and the pawl 56 moves such that, as shown in FIG. 5, the ratchet teeth 76 mesh with the ratchet gear 132. The gear ring 112 thereby coupled to the pawl base 44 through the pawl 56. Rotation force of the gear ring 112 in the take-up direction is accordingly transmitted through the pawl 56 to the pawl base 44, and also transmitted to the spool 22 though the torsion shaft 30.

Due to forward driving force of the motor 142 being transmitted in this manner to the spool 22 and the spool 22 being rotated in the take-up direction, the webbing 24 fitted over the body of an occupant is taken up on the spool 22, and any slight looseness, called slack, in the webbing 24 is eliminated.

In the state in which the output shaft of the motor 142 is mechanically coupled to the spool 22 as described above, if the forward monitoring device 148 detects that the distance between the vehicle and an obstacle in front of the vehicle has become a specific value or greater the ECU 144 drives the motor 142 in the reverse direction. The worm gear 136 is rotated by the reverse driving force output from the motor 142, and the worm gear 136 rotates the worm wheel 134, namely the gear ring 112, in the pullout direction. When the gear ring 112 is rotated in the pullout direction the leading end side of the clutch pawl 116 inside the pawl housing portion 114 makes contact with the engaging portion 126.

When the gear ring 112 rotates further in the pullout direction from this state, the clutch pawl 116 rotates in the take-up direction about the base end side of the clutch pawl 116, separating the leading end of the clutch pawl 116 from the ratchet gear 118. When the gear ring 112 thus rotates in the pullout direction, meshing between the ratchet teeth 76 and the ratchet gear 132 is also released, and also action of take-up direction rotation force to the V-gear 58 is released, and the compression coil spring 70 pressing the inside walls of the spring anchor wall 66 and the pawl housing portion 54 rotates the V-gear 58 in the pullout direction relative to the pawl base 44.

The guide pin 74 is guided by the guide hole 72 by this relative rotation, and the pawl 56 returns to being housed inside the pawl housing portion 54. The webbing take-up device 10 hence returns to its original state (the state prior to forward driving of the motor 142).

VSIR Mechanism Actuation

When entering a state of rapid vehicle deceleration from the initial state shown in FIG. 3, the inertia ball 94 on the sloping faces of the mounting portion 92 in the webbing take-up device 10 moves under inertia and climbs the sloping faces of the mounting portion 92 such that the inertia ball 94 pushes the engagement claw 96 upwards. The engagement claw 96 that has been pushed up by the inertia ball 94 meshes with the ratchet gear 88 of the V-gear 58 and restricts rotation of the pawl 56 in the pullout direction. When the webbing 24 fitted over the body of an occupant of the vehicle is pulled in this state by movement of the body towards the vehicle front due to inertia and the spool 22 is rotated in the pullout direction, the pawl base 44 is restricted from relative rotation with respect to the spool 22 through the torsion shaft 30, but the pawl base 44 rotates in the pullout direction relative to the V-gear 58.

Figure 6:
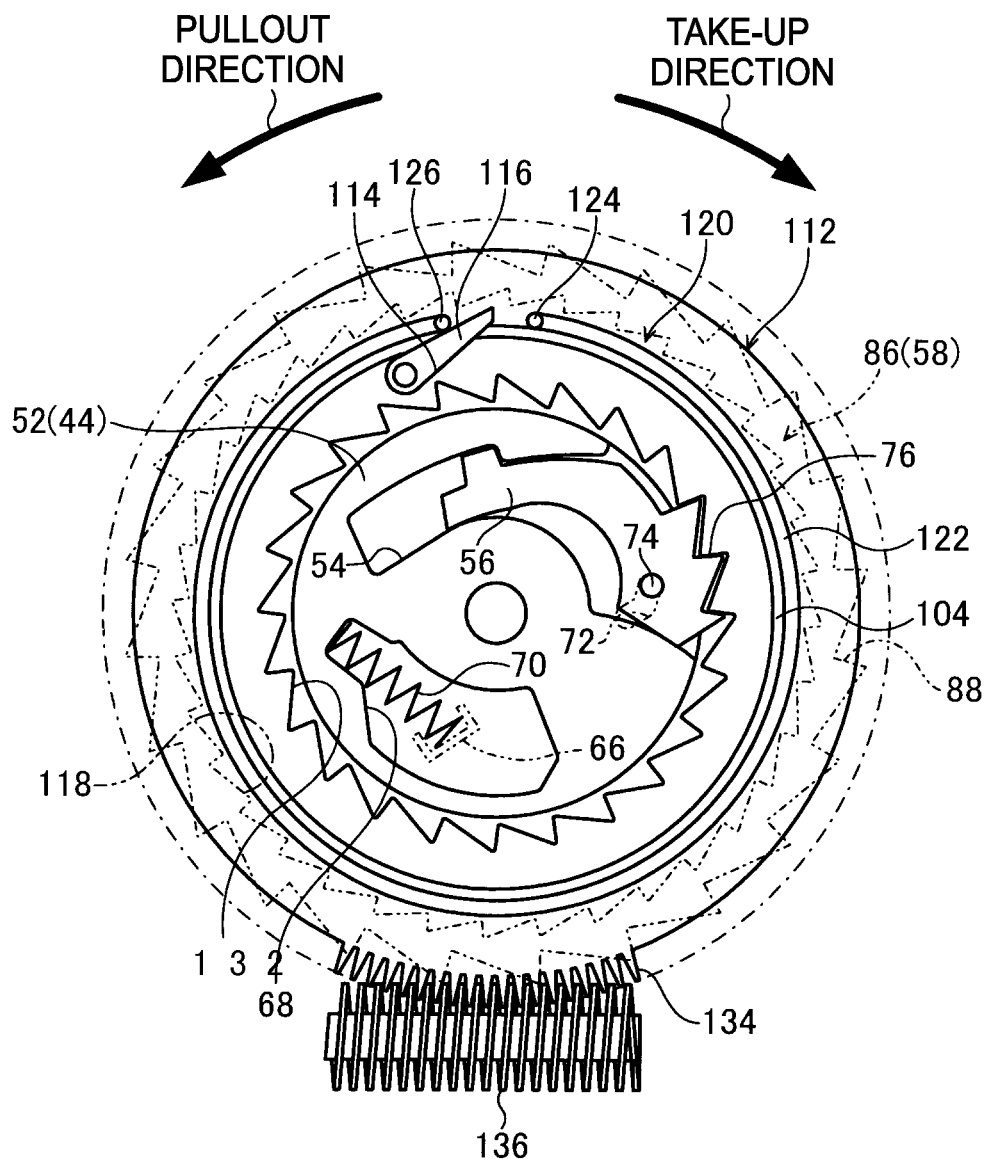
FIG. 6 is a side view corresponding to FIG. 3 and illustrates a state in which the spool has relatively rotated with respect to the first rotation body from the state shown in FIG. 3 and the spool and the second rotation body have been linked by the first clutch member.

Due to relative rotation of the pawl base 44 in the pullout direction with respect to the V-gear 58 being equivalent to relative rotation of the V-gear 58 in the take-up direction with respect to the pawl base 44, due to such relative rotation occurring the guide pin 74 is guided by the guide hole 72, moving the pawl 56 such that, as shown in FIG. 6, the ratchet teeth 76 mesh with the ratchet gear 132. The pawl base 44 is thereby connected to the gear ring 112 through the pawl 56. In this state the spool 22 attempts to rotate the gear ring 112 in the pullout direction through the torsion shaft 30, the pawl base 44 and the pawl 56.

However, the rotation force transmission mechanism using the worm gear 136 and the worm wheel 134 is not capable of transmitting rotation of the worm wheel 134 to the worm gear 136. Accordingly, rotation of the gear ring 112 in the pullout direction is restricted. Due to rotation of the pawl base 44 in the pullout direction with respect to the gear ring 112 being restricted in the state in which the ratchet teeth 76 is meshed with the ratchet gear 132, rotation of the spool 22, whose relative rotation with respect to the pawl base 44 is restricted, is also restricted. By restricting rotation of the spool 22 in the pullout direction in this manner, the webbing 24 is restricted from being pulled out from the spool 22, efficiently restraining movement of an occupant towards the vehicle front under inertia with the webbing 24.

WSIR Mechanism Actuation

In the webbing take-up device 10, when the webbing 24 fitted over the body of an occupant is pulled and the spool 22 is rotated in the pullout direction, the pawl base 44 accordingly rotates as a unit therewith in the pullout direction. When the pawl base 44 rotates in the pullout direction the internal wall of the spring housing portion 68 presses against the compression coil spring 70, and the compression coil spring 70 presses the spring anchor wall 66 so as to rotate the V-gear 58 in the pullout direction.

When the rotation acceleration of the V-gear 58 in the pullout direction is greater than a specific amount due to the webbing 24 being pulled by the body of an occupant attempting to move towards the vehicle front under inertia due to rapid vehicle deceleration, the W-pawl 80 becomes unable to follow rotation of the V-gear 58. The W-pawl 80 hence rotates about the support pin 78 relative to the V-gear 58, and the W-pawl 80 meshes with the ratchet gear 84 of the sensor holder 82 thereby restricting rotation of the V-gear 58 in the pullout direction. If the V-gear 58 rotates in the pullout direction in such a state in which rotation of the V-gear 58 in the pullout direction is restricted, as explained above under "VSIR Mechanism Actuation" and as shown in FIG. 6, the ratchet teeth 76 mesh with the ratchet gear 132 and the pawl base 44 is coupled to the gear ring 112 through the pawl 56.

By thus restricting rotation of the spool 22 in the pullout direction, the webbing 24 is restricted from being pulled out from the spool 22, and efficiently restraining movement of an occupant towards the vehicle front under inertia with the webbing 24.

Energy Absorption by the Torsion Shaft 30

The spool 22 is restricted from rotating in the pullout direction when the "VSIR Mechanism" and/or the "WSIR Mechanism" is actuated as described above. In this state if, for example, the tensional force applied to the webbing 24, by the body of an occupant trying to move towards the vehicle front under inertia induced by rapid vehicle deceleration, exceeds a specific amount, the rotational force in the pullout direction on the spool 22 will then exceed the mechanical strength of the torsion shaft main body 32 in the torsion shaft 30. The spool-side coupling portion 34 then rotates in the pullout direction with respect to the pawl-base-side coupling portion 50 of the torsion shaft 30, inducing twisting deformation in the torsion shaft main body 32.

The spool 22 is able to rotate in the pullout direction by the amount by which the torsion shaft main body 32 twists, and a length of the webbing 24 corresponding to the amount of rotation of the spool 22 is pulled out from the spool 22. Accompanying this action a portion of the tensional force applied to the webbing 24 by the body of an occupant is absorbed by the twisting deformation of the torsion shaft main body 32.

Characteristic Operation and Effect of the Present Exemplary Embodiment from the Operation Perspective When, after approaching the vicinity of the obstacle in front of the vehicle, the vehicle actually impacts with the obstacle, the motor 142 is driven forward so as to couple the gear ring 112 to the pawl base 44 through the pawl 56 as explained above under "Forward Obstacle Detection".

The spool 22 is thereby restricted from rotating in the pullout direction by the self-locking mechanism of the worm gear 136 and the worm wheel 134. Accordingly, in the webbing take-up device 10 the rotation of the spool 22 in the pullout direction can be speedily restricted by detection of the forward obstacle and the state achieved by forward driving the motor 142 without having to wait for operation of the "VSIR Mechanism" or the "WSIR Mechanism".

Furthermore, the motor 142 is driven forward and the spool 22 is rotated in the take-up direction prior to impact of the vehicle with the forward obstacle, any slack is accordingly eliminated when the webbing 24 is taken up on the spool 22. In addition, not only is slack eliminated in the portion of the webbing 24 fitting across the body of an occupant but also slackness in the webbing 24 wound on the spool 22 is eliminated, tightening the winding of the webbing 24 on the spool 22. Accordingly, even if the body of an occupant attempts to move towards the vehicle front under inertia, the body of an occupant can be tightly constrained without slack in the webbing 24 on the spool 22 being pulled out from the spool 22.

Since the slack of the webbing 24 wound on the spool 22 has also been eliminated, twisting deformation of the torsion shaft main body 32 in the torsion shaft 30 is initiated from the initial stage of movement under inertia when the body of an occupant moves under inertia towards the vehicle front. Consequently, in the webbing take-up device 10 twisting distortion of the torsion shaft main body 32 is not initiated only after momentum has been achieved after initiating movement of the body of an occupant under inertia, and instead twisting deformation of the torsion shaft main body 32 in the torsion shaft 30 is initiated from the initial stage of movement of the body of an occupant under inertia. This accordingly enables the energy absorbing efficiency in twisting deformation of the torsion shaft main body 32 to be raised.

Characteristic Operation and Effect of the Present Exemplary Embodiment from the Structural Perspective In the webbing take-up device 10, when the motor 142 is driven forward and a state in which the gear ring 112 is coupled to the pawl base 44 through the pawl 56 has been achieved, rotation force in the pullout direction imparted to the spool 22 when the webbing 24 is pulled by the body of an occupant under rapid vehicle deceleration, as described above, is inevitably transmitted to the worm wheel 134 of the gear ring 112.

Sufficient mechanical strength is hence provided by the ratchet teeth 76 of the pawl 56 and the ratchet gear 132 of the gear ring 112, and also by the teeth formed on the worm wheel 134 of the gear ring 112 and the worm gear 136, to counter this rotation force in the pullout direction.

The components providing sufficient mechanical strength are not only employed for configuring the lock portion on the rotation force transmission path of the worm wheel 134 to the worm gear 136, but are also employed in the transmission mechanism of the driving force of the motor 142. Accordingly, sufficient durability can also be achieved in the transmission mechanism of the driving force for output from the motor 142 even when the output of the motor 142 is increased. Namely, in the webbing take-up device 10 according to the present exemplary embodiment, an increase in the output of the motor 142 is enabled while still suppressing an increase in size and weight, and actuation explained under "Forward Obstacle Detection" can be speedily performed.

Further, since by employing the transmission path for the rotation force from the spool 22 to the worm wheel 134 and the worm gear 136 configuring the lock portion as common with the transmission mechanism of driving force from the motor 142, many components are common, the number of components can be reduced overall, and a cost reduction can be achieved.

In addition, sufficient mechanical strength is imparted to counteract such rotational force in the pullout direction by the ratchet teeth 76 of the pawl 56 and the ratchet gear 132 of the gear ring 112, and also by the teeth of the worm wheel 134 on the gear ring 112 and the worm gear 136. Structurally speaking, in the coupled state of the gear ring 112 to the pawl base 44 through the pawl 56, the rotation force imparted to the spool 22 in the pullout direction is inevitably transmitted to the worm wheel 134 of the gear ring 112. Consequently, there is no requirement to provide a mechanism in the pullout direction rotation force transmission path of the spool 22 between the spool 22 and the worm wheel 134 to release the rotation force in the pullout direction, namely no requirement to provide an overload release mechanism.

What is claimed is:

1. A webbing take-up device comprising:
   a spool to which a base end side of webbing is anchored and that takes up the webbing by rotating in a take-up direction;
   a lock portion that restricts rotation of the spool in a pullout direction opposite to the take-up direction, in a coupled state capable of transmitting rotation force to the spool;
   a sensor portion that actuates in a state of rapid vehicle deceleration in which a vehicle is being decelerated with a deceleration of a specific value or greater, a state in which the spool is rapidly rotated with an acceleration of a specific value or greater in the pullout direction, or a combination thereof;
   a drive portion that rotates the spool in the take-up direction by forward driving force output and that actuates the sensor portion; and
   a clutch portion that couples the spool and the lock portion by actuation of the sensor portion,
   wherein the lock portion is interposed between the drive portion and the spool, and enables rotation force output from the drive portion to be transmitted to the spool side; and the clutch portion is interposed between the spool and the lock portion, and actuates the sensor portion by output from the drive portion of forward driving force such that a same clutch portion can transmit both said driving force to said spool from said drive portion and a rotating restricting force to said spool from the lock portion.

2. The webbing take-up device of claim 1, wherein in a coupled state of the spool and the lock portion by the clutch portion, coupling of the lock portion and the spool by the clutch portion is eliminated by output from the drive portion of reverse driving force opposite to the forward driving force.

3. The webbing take-up device of claim 1 further comprising:
   a first rotation body on the transmission path of driving force from the drive portion, further to the spool side than the lock portion, and provided relatively rotatable with respect to the spool, the first rotation body being restricted by the lock portion from rotation in the pullout direction when the lock portion is actuated; and
   an energy absorbing member that is provided straddling between the spool and the first rotation body, restricts relative rotation of the spool with respect to the first rotation body, and deforms when a rotation force of a specific value or greater is imparted to spool in a state in which rotation of the first rotation body is restricted by the lock portion.

4. The webbing take-up device of claim 3 further comprising:
   a second rotation body provided so as to be capable of relative rotation with respect to the spool; and
   a following biasing member that is interposed between the second rotation body and the spool, and biases the second rotation body towards restricting relative rotation of the second rotation body with respect to the spool such that the following biasing member causes the spool or the second rotation body to follow rotation of the other member of the spool or the second rotation body, wherein,
   the sensor portion is configured such that the second rotation body becomes capable of relative rotation with respect to the spool against biasing force of the following biasing member when the second rotation body is rotated at an acceleration of a specific value or greater corresponding to the rapid rotation state; and
   the clutch portion comprising:
      a third rotation body that rotates when transmitted with driving force from the drive portion,
      a first clutch member that connects the spool to the third rotation body when the spool has been relatively rotated in the pullout direction with respect to the second rotation body against biasing force of the following biasing member, and
      a second clutch member that connects the third rotation body to the second rotation body when forward driving force is transmitted to the third rotation body and rotates the second rotation body with an acceleration of the specific value or greater.

5. The webbing take-up device of claim 3, wherein the lock portion comprising:
   a worm gear that rotates under driving force output from the drive portion; and
   a worm wheel that meshes with the worm gear and rotates under transmission of rotation of the worm gear, the worm wheel configured such that rotation of the worm gear is transmittable to the clutch portion and rotation due to rotation force transmitted from the clutch portion side is restricted by the worm gear;
   and reinforces the cylinder wall containing the gas generator unit.

6. The webbing take-up device of claim 1, wherein the clutch portion includes a single pawl.

* * * * *